US011932391B2

(12) United States Patent
Ju et al.

(10) Patent No.: US 11,932,391 B2
(45) Date of Patent: Mar. 19, 2024

(54) WIRELESS COMMUNICATION RELAY SYSTEM USING UNMANNED DEVICE AND METHOD THEREFOR

(71) Applicant: HANWHA AEROSPACE CO., LTD., Changwon-si (KR)

(72) Inventors: Jae Hyuk Ju, Changwon-si (KR); Ki Seok Kim, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 255 days.

(21) Appl. No.: 16/903,557

(22) Filed: Jun. 17, 2020

(65) Prior Publication Data

US 2020/0317339 A1 Oct. 8, 2020

Related U.S. Application Data

(63) Continuation of application No. PCT/KR2018/002768, filed on Mar. 8, 2018.

(30) Foreign Application Priority Data

Dec. 19, 2017 (KR) .......................... 10-2017-0174769

(51) Int. Cl.
*B64C 39/02* (2023.01)
*B64D 47/08* (2006.01)
(Continued)

(52) U.S. Cl.
CPC ............ *B64C 39/024* (2013.01); *B64D 47/08* (2013.01); *G05D 1/0011* (2013.01);
(Continued)

(58) Field of Classification Search
CPC . B64C 39/024; B64C 2201/122; B64D 47/08; G05D 1/0011; G05D 1/0276; G05D 1/101; H04B 7/18504; H04W 84/06
See application file for complete search history.

(56) References Cited

U.S. PATENT DOCUMENTS 9,836,049 B1\* 12/2017 Tu ........................ B64C 39/022
9,869,049 B2   1/2018 Park et al.
(Continued)

FOREIGN PATENT DOCUMENTS

KR       10-1037200 B1      5/2011
KR      101037200 B1 *     5/2011    .............. B25J 19/02
(Continued)

OTHER PUBLICATIONS

N. Michael, J. Fink and V. Kumar, "Controlling a team of ground robots via an aerial robot," 2007 IEEE/RSJ International Conference on Intelligent Robots and Systems, 2007, pp. 965-970, doi: 10.1109/IROS.2007.4399589. (Year: 2007).\*

(Continued)

*Primary Examiner* — Ig T An
*Assistant Examiner* — Christine Nguyen Huynh
(74) *Attorney, Agent, or Firm* — Sughrue Mion, PLLC (57) ABSTRACT

An unmanned device used in a wireless communication relay system includes: a surrounding environment information detector acquiring information on a surrounding environment of a moving object; a processor generating a control command for the moving object based on the acquired information on the surrounding environment; and a communication interface for transmitting the control command generated by the processor to the moving object, wherein the unmanned device is located at a predetermined height and relays communication between the moving object and a control center, and thus, even when wireless communication between the control center and the moving object is difficult due to an obstacle or the like, the connection of the wireless communication may be maintained without disconnection of the wireless communication.

18 Claims, 7 Drawing Sheets

(51) Int. Cl.

| | |
|---|---|
| *B64U 101/20* | (2023.01) |
| *G05D 1/00* | (2006.01) |
| *G05D 1/02* | (2020.01) |
| *G05D 1/10* | (2006.01) |
| *H04B 7/185* | (2006.01) |
| *H04W 84/06* | (2009.01) |

(52) U.S. Cl.
CPC ........... *G05D 1/0276* (2013.01); *G05D 1/101* (2013.01); *H04B 7/18504* (2013.01); *B64U 2101/20* (2023.01); *H04W 84/06* (2013.01)

(56) References Cited

U.S. PATENT DOCUMENTS

| | | |
|---|---|---|
| 2017/0161972 A1 | 6/2017 | Moloney et al. |
| 2019/0042859 A1* | 2/2019 | Schubert .................. B62D 1/28 |

FOREIGN PATENT DOCUMENTS

| | | | | |
|---|---|---|---|---|
| KR | 10-1388206 B1 | 4/2014 | | |
| KR | 10-1745916 B1 | 6/2017 | | |
| KR | 10-2017-0081846 A | 7/2017 | | |
| KR | 20170081846 A | * 7/2017 | ............... | G05D 1/00 |
| KR | 10-2017-0099563 A | 9/2017 | | |

OTHER PUBLICATIONS

J. Li, G. Deng, C. Luo, Q. Lin, Q. Yan and Z. Ming, "A Hybrid Path Planning Method in Unmanned Air/Ground Vehicle (UAV/UGV) Cooperative Systems," in IEEE Transactions on Vehicular Technology, vol. 65, No. 12, pp. 9585-9596, Dec. 2016 (Year: 2016).*

Communication dated Mar. 22, 2022, issued by the Korean Intellectual Property Office in Korean Patent Application No. 10-2017-0174769.

Communication dated Mar. 8, 2023, issued by the Korean Patent Office for Korean Application No. 10-2017-0174769.

* cited by examiner

WIRELESS COMMUNICATION RELAY SYSTEM USING UNMANNED DEVICE AND METHOD THEREFOR

CROSS-REFERENCE TO THE RELATED APPLICATION

This application is a continuation of International Patent Application No. PCT/KR2018/002768 filed on Mar. 8, 2018, and claims priority from Korean Patent Application No. 10-2017-0174769 filed on Dec. 19, 2017 in the Korean Intellectual Property Office, and all the benefits accruing therefrom under 35 U.S.C. 119, the disclosure of which is incorporated herein by reference in its entirety.

BACKGROUND

1. Technical Field

The present disclosure relates to a wireless communication relay system and a method therefor, and more particularly, to an unmanned device which relays wireless communication between a control center and a moving object, a wireless communication relay system using the unmanned device, and a method therefor.

2. Description of the Related Art

In the case of disaster areas, war areas, or mountain areas, wireless communication may be difficult due to obstacles or the like. Therefore, various attempts are being made to provide wireless communication to wireless communication shadow areas where wireless communication is not performed properly. One of the attempts is Google's Loon project using a flyable object. Google's Loon project is a project to provide Internet services to users located below a large hot-air balloon by attaching a network service device to the hot-air balloon that self-generates power using sunlight and sending the hot-air balloon to the stratosphere. A representative service dispatched to a disaster area to urgently provide Internet services is Cisco' network emergency response vehicle (NERV). The NERV takes the form of a truck equipped with various network equipment and is dispatched to disaster areas to quickly provide satellite communication-based network services.

The Google's Loon project targets a very wide area, and horizontal or vertical movement is limited due to the nature of the hot-air balloon. In addition, the Cisco's NERV is limited in providing wireless communication services in all areas or consumes a lot of time due to the limitation of moving along the ground.

SUMMARY

Example embodiments of the inventive concept provide an unmanned device which relays wireless communication between a control center and a moving object to prevent interruption of the wireless communication between the control center and the moving object, and controls the movement of the moving object.

The example embodiments also provide a wireless communication relay system which relays wireless communication between the control center and the moving object based on the unmanned device to prevent interruption of the wireless communication between the control center and the moving object, and controls the movement of the moving object.

The example embodiment further provide a wireless communication relay method employed to relay wireless communication between the control center and the moving object by using the unmanned device to prevent interruption of the wireless communication between the control center and the moving object, and employed to control the movement of the moving object.

However, the inventive concept is not restricted to those set forth herein. The above and other aspects of the inventive concept will become more apparent to one of ordinary skill in the art to which the inventive concept pertains by referencing the detailed description of the example embodiments given below.

According to an example embodiment, there is provided an unmanned device located at a predetermined height. The unmanned device may include: a surrounding environment information detector which acquires information on a surrounding environment of a moving object; a processor which generates a control command for the moving object based on the information on the surrounding environment; and a communication interface which transmits the control command generated by the processor to the moving object.

The surrounding environment information detector may comprise at least one of a camera photographing the surrounding environment of the moving object and a light detection and ranging (LIDAR) sensor detecting the surrounding environment of the moving object.

The communication interface may transmit data received from the moving object to a control center and/or transmit data received from the control center to the moving object.

The communication interface may relay communication between the control center and the moving object when there is a hindrance to direct communication between the control center and the moving object.

The control command generated by the processor may comprise at least one of a movement path, a movement speed, a movement distance, and a movement target point of the moving object.

The processor may derive a candidate movement path to a target point based on the information on the surrounding environment and derive an optimal movement path by determining whether an obstacle or an enemy exists on the candidate movement path.

The processor may compare the information on the surrounding environment with previously stored data and generates a previously stored movement path as a movement path for the moving object if the information on the surrounding environment has a predetermined degree of similarity to the previously stored data.

The communication interface may receive the information on the surrounding environment of the moving object from the moving object, and the processor may generate the control command for the moving object based on the information on the surrounding environment and other information received from the moving object.

The surrounding environment information detector may acquire information on an area other than the surrounding environment of the moving object, from which information has already been acquired, based on a command execution time of the moving object according to a previously generated control command.

According to an example embodiment, there is provided a wireless communication relay system which may include: a moving object which moves to a destination or performs a task while moving within a working range; a control center which performs wireless communication with the moving object; and an unmanned device which controls the moving object and/or the control center by generating a control command for the moving object and/or the control center using information on a surrounding environment of the moving object and/or the control center, and relays communication between the control center and the moving object.

The unmanned device may be located at a predetermined height and may comprise: a surrounding environment information detector which acquires the information on the surrounding environment of the moving object and/or the control center; a processor which generates the control command for the moving object and/or the control center based on the information on the surrounding environment; and a communication interface which transmits the control command generated by the processor to the moving object and/or the control center.

The control command generated by the unmanned device may comprise at least one of a movement path, movement speed, a movement distance, a distance between the moving object and the control center, and a movement target point.

The moving object, the control center, and the unmanned device may transmit and receive, and thus, share at least one of a current position of at least one of the moving object, the control center, and the unmanned device, movement speed of at least one of the moving object, the control center, and the unmanned device, and data stored in at least one of the moving object, the control center, and the unmanned device, on a real time basis.

When a situation where the moving object cannot move occurs, the moving object, the control center and the unmanned device may stop moving, and the unmanned device may search again for a movement path along which the moving object can move.

If reception strength of communication between the moving object, the control center and the unmanned device may be less than a threshold level, the movement of the moving object may be stopped, and the control center and/or the unmanned device may move so that the reception strength of the communication between the moving object, the control center and the unmanned device becomes equal to or greater than the threshold level.

According to an example embodiment, there is provided a wireless communication relay method which may include: acquiring information on a surrounding environment of a moving object and/or a control center by using an unmanned device; generating a control command for the moving object and/or the control center using the information on the surrounding environment by using the unmanned device; and transmitting the control command to the moving object and/or the control center by using the unmanned device, wherein the unmanned device is located at a predetermined height to relay communication between the moving object and the control center.

The generating the control command may include: comparing the information on the surrounding environment with previously stored data; determining whether the information on the surrounding environment has a predetermined degree of similarity to the previously stored data; and generating a previous control command stored in existing data as the control command if there is the existing data having the predetermined degree of similarity in the previously stored data.

The wireless communication relay method may further include: generating another control command based on the information on the surrounding information if it is determined that there is no existing data having the predetermined degree of similarity in the determining whether the information on the surrounding environment has the predetermined degree of similarity to the previously stored data; and storing the other control command and the information on the surrounding environment together.

The control command may comprise at least one of a movement path, a movement speed, a movement distance, and a movement target point of the moving object.

The generating the control command may comprise: deriving a candidate movement path to a target point by using the information on the surrounding environment; and deriving an optimal movement path by determining whether an obstacle or an enemy exists on the candidate movement path.

According to the above embodiments, even when wireless communication between the control center and the moving object is difficult due to an obstacle or the like, the wireless communication can be maintained without interruption of the wireless communication. In addition, since an optimal movement path can be derived according to a surrounding environment or a surrounding situation, the moving object can efficiently move to a destination.

The embodiments of the inventive concept are not limited to the above-described embodiments and other embodiment which are not described herein will become apparent to those skilled in the art from the following description.

DETAILED DESCRIPTION

Advantages and features of the inventive concept and methods of accomplishing the same may be understood more readily by reference to the following detailed descriptions of example embodiments and the accompanying drawings. The embodiments presented herein are all example embodiments of the inventive concept. The inventive concept may, however, be embodied in many different forms and should not be construed as being limited to the embodiments set forth herein. Rather, these embodiments are provided so that this disclosure will be thorough and complete and will fully convey the concept of the invention to those skilled in the art, and the present disclosure will only be defined by the appended claims. Like reference numerals refer to like elements throughout the specification.

Unless otherwise defined, all terms (including technical and scientific terms) used herein have the same meaning as commonly understood by one of ordinary skill in the art to which this inventive concept belongs. Further, it will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated elements, but do not preclude the presence or addition of one or more other elements.

Figure 1:
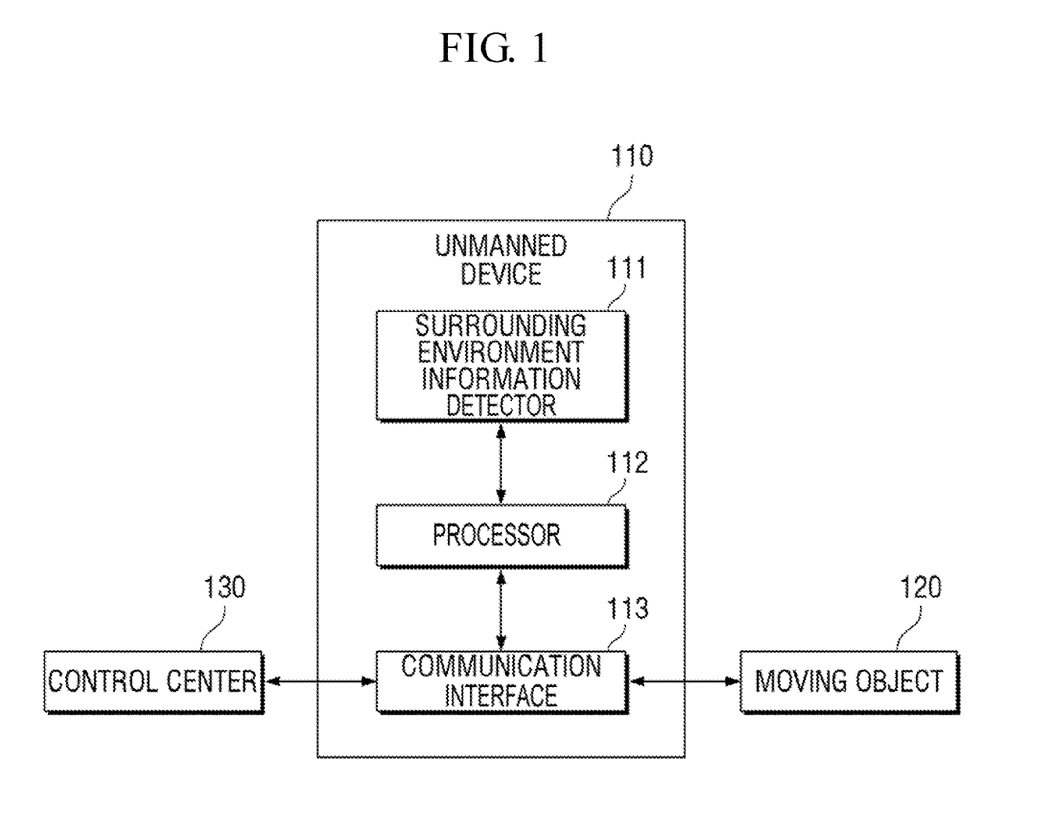
FIG. 1 is a block diagram of an unmanned device according to an embodiment.

FIG. 1 is a block diagram of an unmanned device according to an embodiment.

An unmanned device 110 according to the embodiment controls a moving object 120 to safely and quickly move to a target point by using information on a surrounding environment of the moving object 120 or a control center 130. In addition, it may relay communication between the moving object 120 and the control center 130. The unmanned device 110 may be located at a predetermined height to acquire the information on the surrounding environment of the moving object 120 or the control center 130. The height at which the unmanned device 110 is located may be higher than a height of an obstacle existing in a range in which the moving object 120 moves, may be set in advance or set by the control enter 130, and may vary according to the surrounding environment. The unmanned device 110 may be one of an unmanned flying device, a device fixed to a flying object, and a device fixed at a predetermined height. The unmanned device 110 may be an unmanned flying device itself or a device fixed to a flying object such as a plane, a helicopter, or a drone not being limited thereto. Alternatively, the unmanned device 110 may be a device fixed to a structure having a certain height such as a high-rise building. When the unmanned device 110 is fixed to a structure, photographing may be limited according to a photographing angle or a photographing area. Therefore, it may be desirable to implement the unmanned device 110 as an unmanned flying device such as a drone. When the unmanned device 110 is implemented as a drone, it may move above the moving object 120 and acquire information on the surrounding environment of the moving object 120. The unmanned device 110 may be controlled by the control center 130 or an external control device for the unmanned device. Alternatively, the unmanned device may be controlled by a preset program or artificial intelligence.

The moving object 120 is a device that moves to a target point or performs a task within a working range. It may move or perform a task and collect information on its surroundings. The collected data may be transmitted to the control center 130 or the unmanned device 110. The moving object 120 may be a robot such as a mission robot deployed in disaster areas or for military operations. It may be a moving object that moves on the ground through wheels or tracks.

The control center 130 wirelessly communicates with the moving object 120 to receive data collected by the moving object 120. When an emergency occurs, the control center 130 may control the unmanned device 110 or the moving object 120 by analyzing information on the emergency or, if an administrator's judgment is required, receive a command from the administrator and then control the unmanned device 110 or the moving object 120.

First, the detailed configuration of the unmanned device 110 and how the unmanned device 110 interacts with the moving object 120 and the control center 130 will be described.

The unmanned device 110 according to the embodiment includes a surrounding environment information detector 111, a processor 112, and a communication interface 113.

The surrounding environment information detector 111 acquires information on the surrounding environment of the moving object 120. More specifically, in order for communication relay and control of the moving object, the surrounding environment information detector 111 acquires information on the surrounding environment on the moving object 120. The surrounding environment information detector 111 may include one or more of a camera that photographs the surrounding environment of the moving object and/or a light detection and ranging (LIDAR) sensor that senses the surrounding environment of the moving object. Various cameras such as a general camera, an infrared camera, and a charge-coupled device (CCD) camera may be used as the camera. In addition, various sensors such as a LIDAR sensor and a motion sensor capable of sensing the surrounding environment may be used.

Here, the LIDAR sensor emits a laser and measures physical characteristics such as distance, concentration, speed and shape of a measurement target from the time taken for the laser scattered or reflected to return and the intensity of the laser, a change in frequency, a change in a polarization state, etc.

The processor 112 generates a control command for the moving object 120 by using the information on the surrounding environment.

More specifically, the processor 112 generates a control command for the moving object by analyzing the information on the surrounding environment acquired by the surrounding environment information detector 111. The control command generated by the processor 112 may include one or more of a movement path, movement speed, a movement distance, and a movement target point of the moving object 120. That is, a control command related to the movement of the moving object 120 is generated.

The processor 112 may derive a candidate movement path to a target point by using the information on the surrounding environment and determine whether there is an obstacle or an enemy on the candidate movement path to derive an optimal movement path. The processor 112 may derive a movement path to a target point of the moving object 120 by using the information on the surrounding environment, and generate a control command to control the moving object 120 to move along the movement path. A candidate movement path that can be travelled is derived according to the surrounding environment. Paths along which the moving object can move to the target point by avoiding an obstacle existing in the surrounding environment are derived as candidate movement paths. When there are a plurality of candidate movement paths, an optimal movement path may be derived from the candidate movement paths in consideration of whether an obstacle or an enemy exists. The optimal movement path may be derived in consideration of the size of an obstacle or the difficulty of passage and, if the moving object 120 is for military use, may be derived in consideration of the existence of an enemy, that is, in consideration of whether the moving object 120 can hide without being caught by the enemy, whether there is a risk of being attacked by the enemy, the degree of expected damage if attacked by the enemy, and the like. A fitness score may be given to each factor considered in deriving the optimal movement path, and a candidate movement path having a highest fitness score may be derived as the optimal movement path.

The processor 112 may compare the information on the surrounding environment with previously stored data, and generate a previously stored movement path as a movement path for the moving object if the information on the surrounding environment has a predetermined degree of similarity to the previously stored data. The processor 112 may use existing data when generating a movement path. It may store a movement path travelled by the moving object 120 and information on a surrounding environment of the movement path, and compare acquired information on a current surrounding environment with the previously stored data to determine the degree of similarity between them. If it is determined that the information on the current surrounding environment has a predetermined degree of similarity to the previously stored data, the previously stored movement path may be derived as a movement path for the moving object 120. The degree of similarity may be calculated for each factor considered in generating a movement path. If the sum of the degrees of similarity is equal to or greater than a predetermined value, it may be determined that the two pieces of data are similar. A threshold degree of similarity based on which two pieces of data are determined to be similar may be preset or set by an administrator or may vary according to the surrounding environment, work content, and characteristics of the moving object. When there is no existing data having a degree of similarity equal to or higher than the threshold degree of similarity, only the information on the current surrounding environment is used to derive a movement path.

The processor 112 may generate a control command for the moving object 120 by using information on the surrounding environment of the moving object collected by the moving object. To this end, the communication interface 113 may receive information on the surrounding environment of the moving object from the moving object 120, and the processor 112 may generate a control command for the moving object 120 by using the information on the surrounding environment acquired by the surrounding environment information detector 111 and the information received from the moving object 120. Since the unmanned device 110 acquires information on the surrounding environment of the moving object 120 at a predetermined height where the unmanned device 110 is positioned, it may be difficult to acquire accurate information on the surrounding environment close to the moving object 120. Therefore, the information on the surrounding environment of the moving object directly collected by the moving object 120 may be used together the information on the surrounding environment acquired by the surrounding environment information detector 111 to generate a control command for the moving object 120. Therefore, a more accurate and efficient control command can be generated. Information on the surrounding environment collected by the control center 130 may also be used.

The communication interface 113 transmits a control command generated by the processor 112 to the moving object 120.

More specifically, to control the moving object 120 through a control command generated by the processor 112, the communication interface 113 transmits the control command to the moving object 120. In addition, the communication interface 113 may transmit data received from the moving object 120 to the control center 130 or transmit data received from the control center 130 to the moving object 120. Further, when there is a hindrance to direct communication between the control center 130 and the moving object 120, the communication interface 113 may relay the communication between the control center 130 and the moving object 120. The communication interface 130 may always relay wireless communication between the moving object 120 and the control center 130, or may relay communication between the control center 130 and the moving object 120 when there is a hindrance to direct communication between the control center 130 and the moving object 120.

The control center 130 may include a device that maintains wireless communication with the moving object 120, receives collected data from the moving object 120, and issues a work command to the moving object 120 by using the data. To receive the data, the control center 130 must continuously maintain communication with the moving object 120. However, when the control center 130 and the moving object 120 are located in a near line of sight (NLOS) where a communication path is partially covered or blocked by an obstacle, direct communication between the control center 130 and the moving object 120 may be hindered, thus making it difficult to maintain the communication. The unmanned device 110 may relay the communication between the control center 130 and the moving object 120 so that the wireless communication between the control center 130 and the moving object 120 can be maintained. Alternatively, if there is a risk that the communication between the control center 130 and the moving object 120 will be eavesdropped or hacked or if there is a risk that the communication between the control center 130 and the moving object 120 will be detected because an enemy is located between the control center 130 and the moving object 120, the unmanned device 110 may relay the communication between the control center 130 and the moving object 120 to bypass the communication between the control center 130 and the moving object 120 so as to escape the risk. Further, a multi-channel using the direct communication between the control center 130 and the moving object 120 as primary communication and the relay communication through the unmanned device 110 as secondary communication may be formed. The movement path derived by the processor 112 may be a movement path to a location where direct communication with the control center 130 is possible.

The unmanned device 110 may control the control center 130 by generating a control command for the control center 130 as well as the moving object 120 and transmitting the control command to the control center 130. To this end, the surrounding environment information detector 111 may acquire information on a surrounding environment of the control center 130, the processor 112 may generate a control command for the control center 130 by using the information on the surrounding environment of the control center 130, and the communication interface 113 may transmit the generated control command for the control center 130 to the control center 130. The control center 130 may include a device that performs wireless communication with the moving object 120 and may be movable. Detailed descriptions of the configuration or process in which the unmanned device 110 acquires information on the surrounding environment of the control center 130, generates a control command for the control center 130, and controls the control center 130 by transmitting the control command to the control center 130 correspond to the descriptions of the configuration in which the unmanned device 110 controls the moving object 120. Therefore, redundant descriptions will be omitted.

Figure 2:
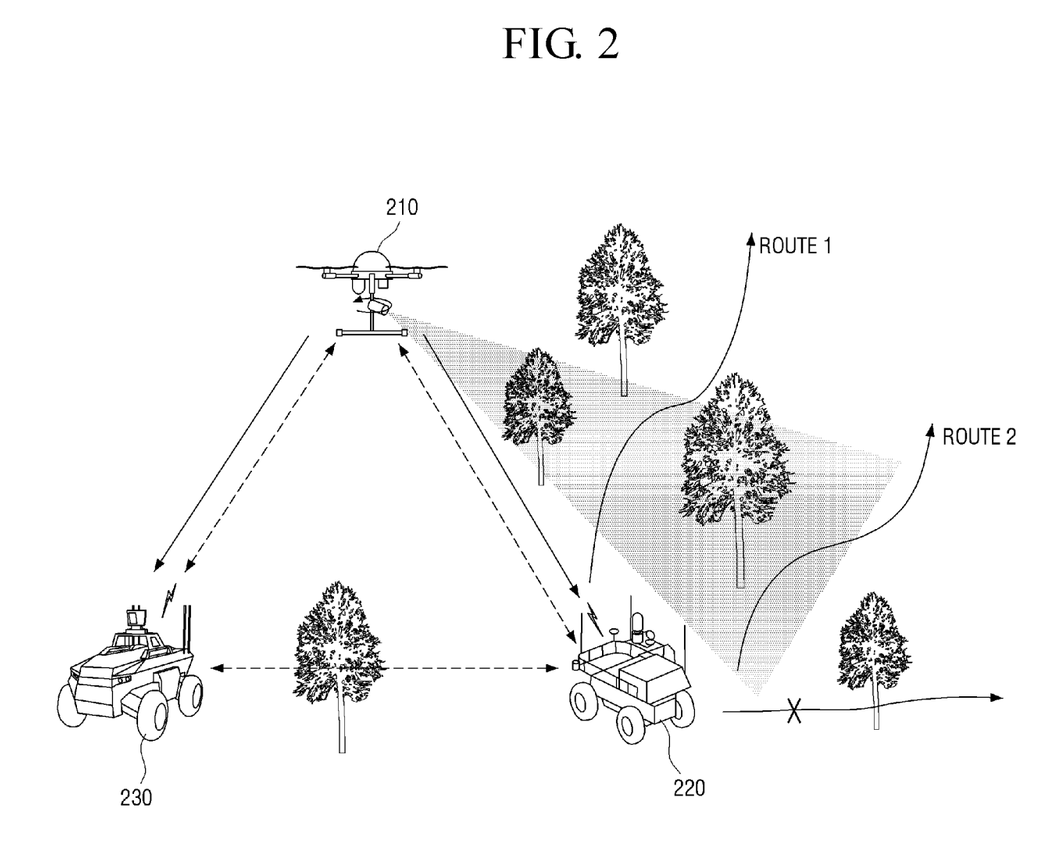
FIG. 2 illustrates an example of an environment in which an unmanned device according to an embodiment is deployed.

FIG. 2 illustrates an example of an environment in which an unmanned device according to an embodiment is deployed. As illustrated in FIG. 2, an embodiment in which an unmanned device 210 is implemented as an unmanned aerial vehicle such as drone and both a moving object 220 and a control center 230 are implemented as movable devices will be described.

Here, the moving object 220 is a mission robot and transmits mission execution data to the control center 230 and the unmanned device 210 while moving in a mission area. The unmanned device 210 is an unmanned aerial vehicle, controls the control center 230 or the moving object 220, which is a surveillance and reconnaissance robot, through surveillance, information collection, topographic/environmental information scan, etc., and stores and analyzes necessary data. The control center 230 performs judgment and control when in an emergency and when an administrator's judgment is necessary.

As shown in FIG. 2, the unmanned device 210 relays wireless communication between the moving object 220 and the control center 230 while controlling the moving object 220 or the control center 230 by generating a control command using acquired information on the surrounding environment. To this end, the unmanned device 210 may move at a predetermined height and photograph an area in which the moving object 220 can move by using a camera and/or acquire information on the surrounding environment of the moving object 220 by detecting the area using a LIDAR sensor. The unmanned device 210 generates a candidate moving path along which the moving object 220 can move by using the acquired information on the surrounding environment, and controls the moving object 220 by transmitting a control command including an optimal moving path to the moving object 220. In addition, it may derive a moving route for the control center 230 and control the control center 230 by transmitting a control command for the control center. At the same time, when direct communication between the moving object 220 and the control center 230 is hindered by an obstacle located between the moving object 220 and the control center 230, the unmanned device 210 may relay the wireless communication between the moving object 220 and the control center 230.

Figure 3:
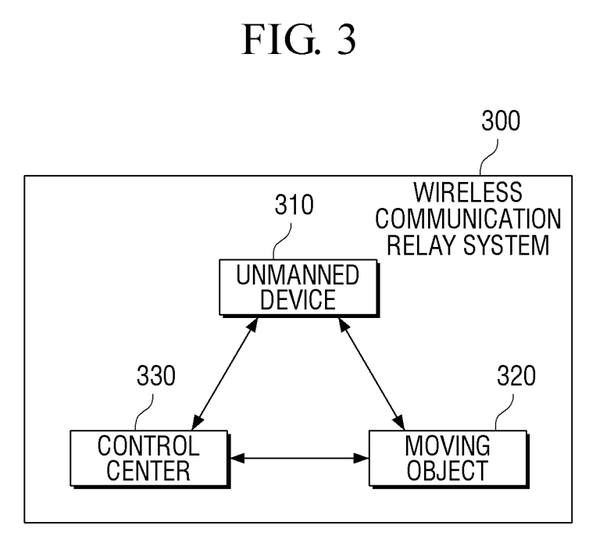
FIG. 3 is a block diagram of a wireless communication relay system according to an embodiment.

FIG. 3 is a block diagram of a wireless communication relay system according to an embodiment.

The wireless communication relay system 300 according to the embodiment includes an unmanned device 310, a moving object 320, and a control center 330. Detailed descriptions of each element of the wireless communication relay system 300 according to the embodiment correspond to the detailed descriptions of the unmanned device 110 of FIG. 1, and thus redundant descriptions will be omitted.

The moving object 320 moves to a destination or performs a task while moving within a working range. The moving object 320 collects images of and/or sensing information on a surrounding environment while moving to a destination and transmits the collected images or information to the control center 330 or the unmanned device 310 through wireless communication. The moving object 320 may receive a control command from the unmanned device 310 or the control center 330 and move or perform a task according to the control command.

The control center 330 performs wireless communication with the moving object 320. The control center 330 may manage the wireless communication relay system 300 by using data included in a signal received from the moving object 320 and/or the unmanned device 310 and transmit a movement or work command to the moving object 320 and/or the unmanned device 310, respectively.

The unmanned device 310 controls the moving object 320 and/or the control center 330 by generating a control command for the moving object 320 and/or the control center 330 using information on the surrounding environment of the moving object 320 and/or the control center 330, and relays communication between the control center 330 and the moving object 320. The unmanned device 310 may include a surrounding environment information detector which acquires information on the surrounding environment of the moving object 320 and/or the control center 330, a processor which generates a control command for the moving object 320 and/or the control center 330 by using the information on the surrounding environment, and a communication interface which transmits the control command generated by the processor to the moving object 320 and/or the control center 330, and may be located at a predetermined height. The control command generated by the unmanned device 310 may include one or more of a movement path, movement speed, a movement distance, a distance between the moving object 320 and the control center 330, and a movement target point.

The moving object 320, the control center 330, and the unmanned device 310 may share one or more of a current position, movement speed, and collected data by transmitting and receiving them in real time. The moving object 320, the control center 330, and the unmanned device 310 may share one or more of each other's current location, movement speed, and collected data in real time so as to move while organically communicating through the wireless communication relay system 300.

When a situation where the moving object 320 cannot move occurs, the moving object 320, the control center 330 and the unmanned device 310 may stop moving, and the unmanned device 310 may search again for a movement path along which the moving object 320 can move. Since the moving object 320 is a leading device that performs a task, the movement of the moving object 320 needs to be considered as a top priority. Therefore, while the moving object 320 is moving according to a control command of the unmanned device 310, if a situation where the moving object 320 cannot move occurs, the moving object 320, the control center 330, and the unmanned device 310 may stop moving. After stopping, the unmanned device 310 may acquire information on the current surrounding environment of the moving object 320 again, generate a control command by searching again for a movement path along which the moving object 320 can move, and transmit the control command to the moving object 320. When the unmanned device 310 searches for the movement path of the moving object 320 again, it may use information collected by the moving object 320 or the control center 330.

If the reception strength of communication between the moving object 320, the control center 330 and the unmanned device 310 is less than a threshold level, the movement of the moving object 320 may be stopped, and the control center 330 and/or the unmanned center 310 may move so that the reception strength of the communication between the moving object 320, the control center 330 and the unmanned device 310 becomes equal to or greater than the threshold level. Since the communication between the moving object 320, the control center 330 and the unmanned device 310 is important as well as the movement of the moving object 320 for performing a task, it should be continuously determined whether the communication between the moving object 320, the control center 330 and the unmanned device 310 is performed normally. If the reception strength of the communication between the moving object 320, the control center 330 and the unmanned device 310 is less than the threshold level, the movement of the moving object 320 may be stopped, and the control center 330 or the unmanned device 310 may move so that the reception strength of the communication between the moving object 320, the control center 330 and the unmanned device 310 becomes equal to or greater than the threshold level. When the reception strength of the communication between the moving object 320, the control center 330 and the unmanned device 310 becomes equal to or greater than the threshold level as a result of the movement of the control center 330 and/or the unmanned device 310, the moving object 320 may move again according to a previously received or newly received control command.

FIGS. 4 through 7 are flowcharts illustrating a wireless communication relay method according to embodiments. Detailed descriptions of the wireless communication relay methods according to the embodiments correspond to the above detailed descriptions of the unmanned device 310 and the wireless communication relay system 300, and thus redundant descriptions will be omitted.

Figure 4:
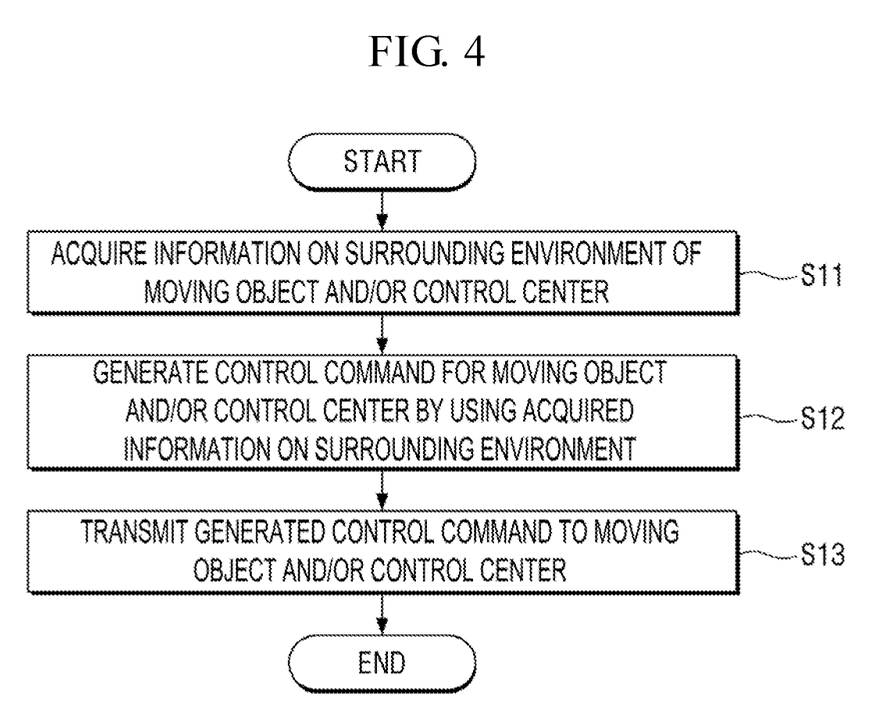
FIGS. 4 through 8 are flowcharts illustrating a wireless communication relay method according to embodiments.

In operation S11, an unmanned device acquires information on a surrounding environment of a moving object and/or a control center. The unmanned device acquires the information on the surrounding environment of the moving object and/or the control center by using a camera and/or a sensor such as a LIDAR sensor. Here, the unmanned device is located at a predetermined height to relay communication between the moving object and the control center.

In operation S12, the unmanned device generates a control command for the moving object and/or the control center by using the information on the surrounding environment. The unmanned device generates a control command regarding a movement path, etc. by using the information on the surrounding environment acquired in operation S11 so that the communication between the moving object and the control center is performed normally or the moving object performs a task.

In operation S13, the unmanned device transmits the generated control command to the moving object and/or the control center. The control command generated in operation S12 is transmitted to the moving object and/or the control center so that the moving object or the control center moves or performs a task according to the control command.

Figure 5:
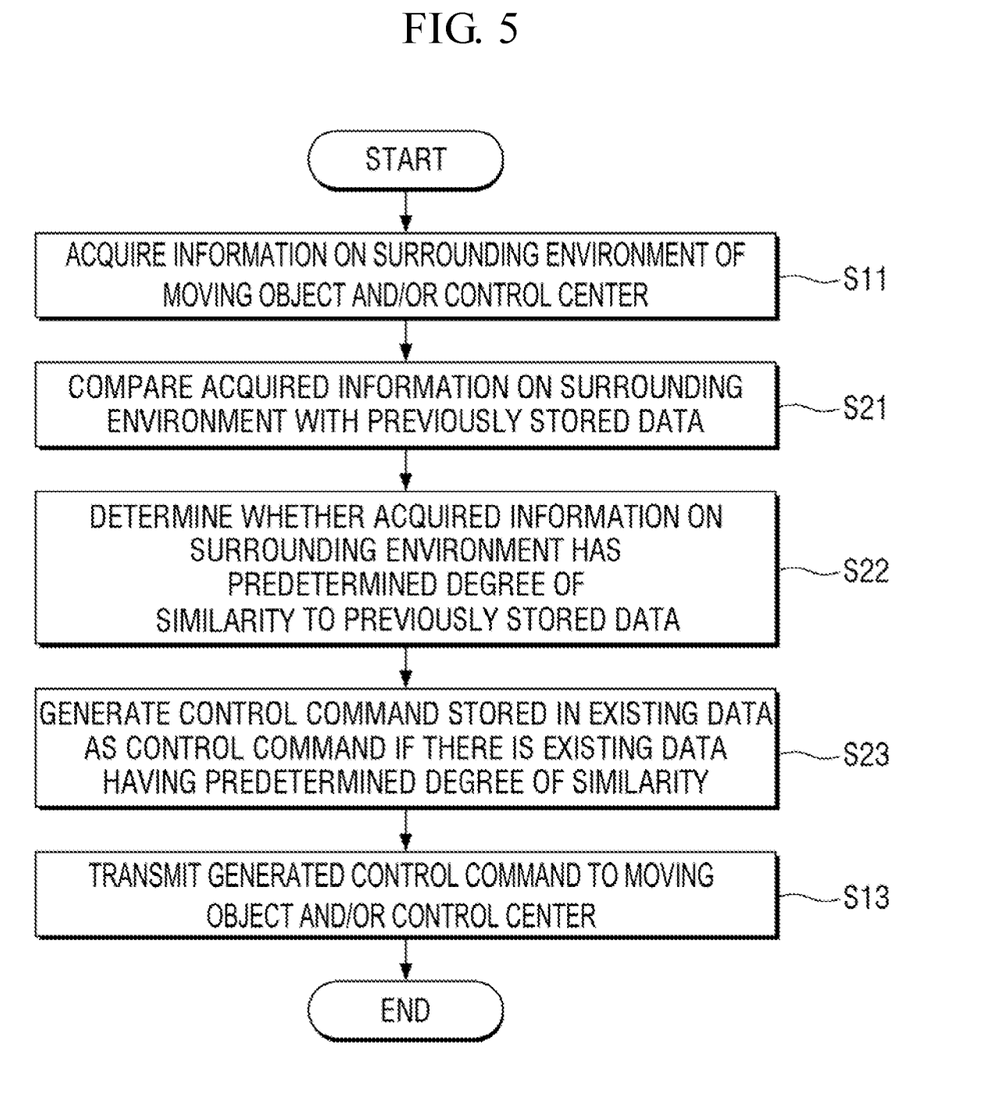
Figure 6:
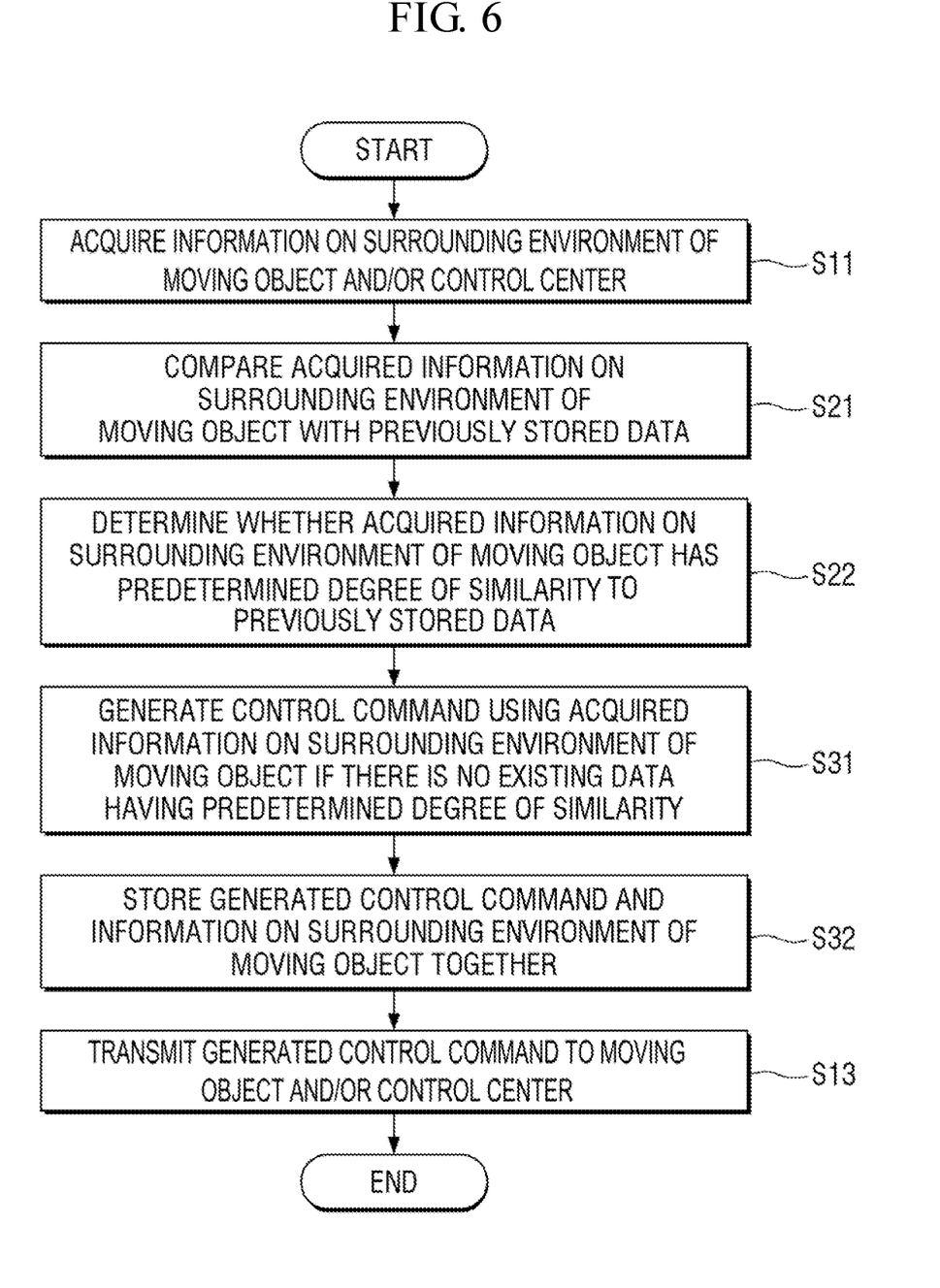
Figure 7:
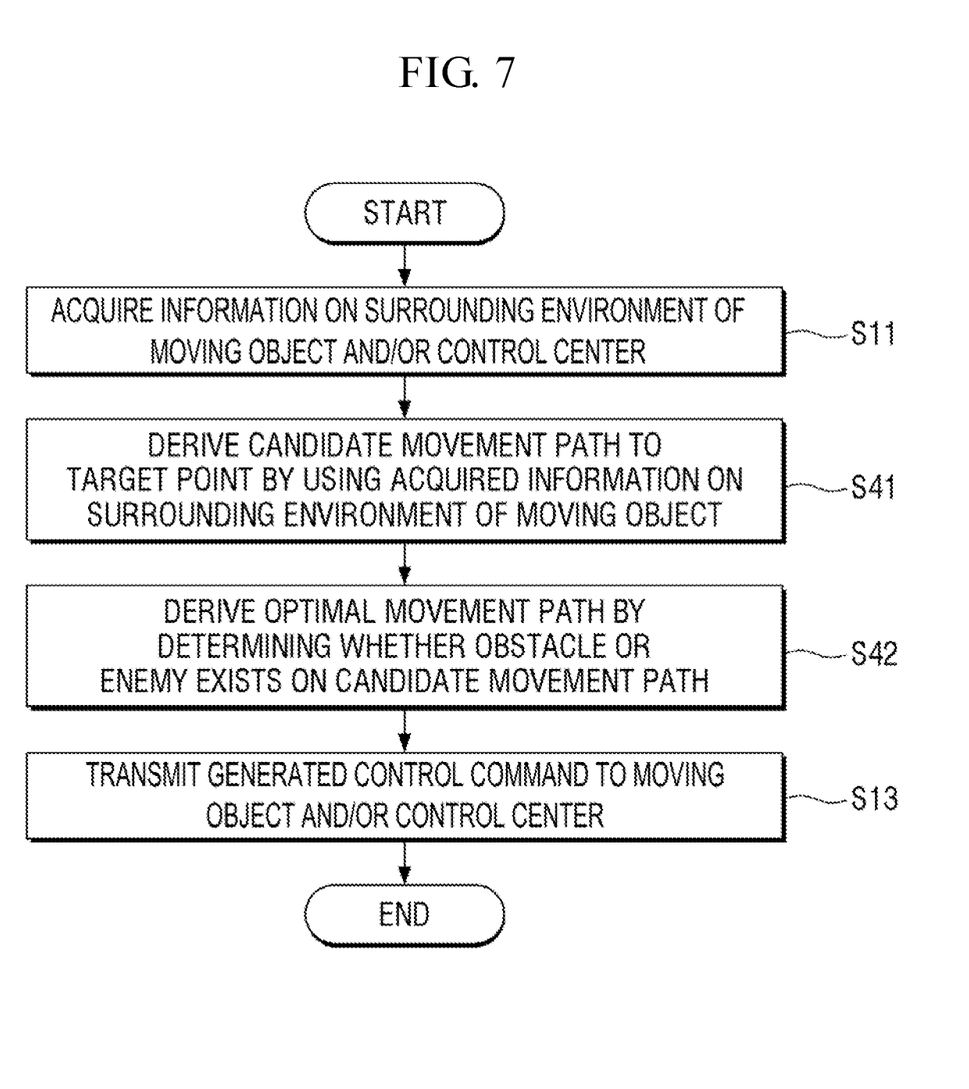

The generating of the control command in operation S12 may be achieved by the methods of FIGS. 5 through 7.

In operation S21, the information on the surrounding environment is compared with previously stored data. In operation S22, it is determined whether the information on the surrounding environment has a predetermined degree of similarity to the previously stored data. In operation S23, if there is existing data having the predetermined degree of similarity, a control command stored in the data may be generated as the control command.

In operation S22 in which it is determined whether the information on the surrounding environment has the predetermined degree of similarity to the previously stored data, if it is determined that there is no existing data having the predetermined degree of similarity, a control command may be generated using the information on the surrounding environment in operation S31, and the generated control command and the information on the surrounding environment may be stored together in operation S32. The information stored in operation S32 may be used by the unmanned device to generate a control command for the moving object and/or the control center later.

The control command generated in operation S12 may include one or more of a movement path, movement speed, a movement distance, and a movement target point of the moving object.

As for generating a movement path, a candidate movement path to a target point may be derived using the information on the surrounding environment in operation S41, and an optimal movement path may be derived by determining whether an obstacle or an enemy exists on the candidate movement path in operation S42. The optimal movement path derived in operation S42 may be included in the control command generated in operation S12.

Figure 8:
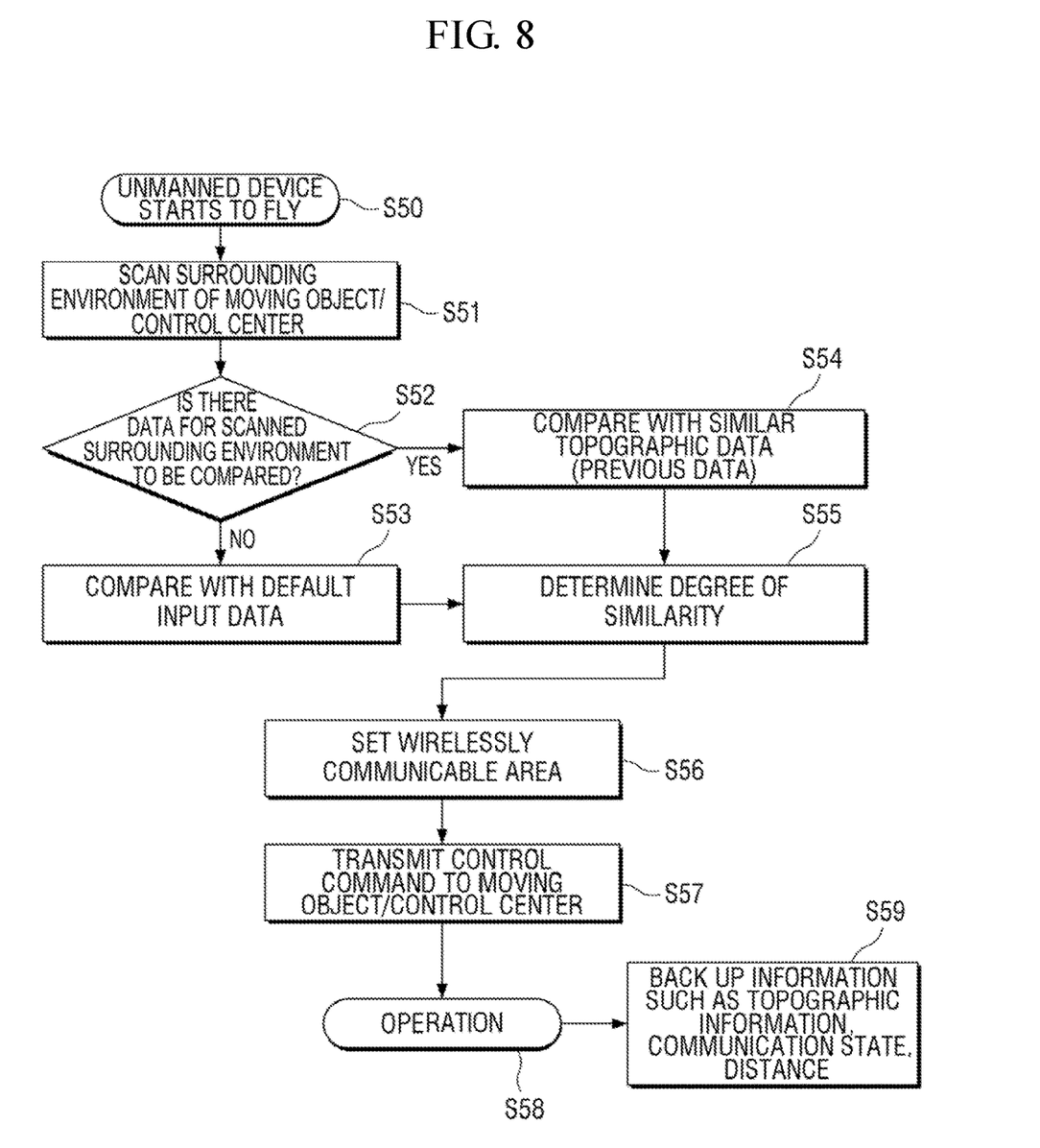

For control and communication relay for the moving object and/or the control center, the unmanned device starts to fly in operation S50 of FIG. 8. The unmanned device scans the surrounding environment of the moving object and/or the control center in operation S51 and compares the scanned surrounding environment with previously stored data in operation S52. If there is no data to be compared, data on the current surrounding environment is compared with default input data in operation S53. If there is data to be compared, the scanned surrounding environment is compared with similar topographic information which is previous data in operation S54, and the degree of similarity is determined in operation S55. A wirelessly communicable area is set in operation S56 through an analysis of the surrounding environment, and a control command is transmitted to the moving object and/or the control center in operation S57. The moving object and/or the control center which receives the control command performs the control command in operation S58, and, in operation S59, the unmanned device backs up information such as the current topographic information/communication state/distance used to generate the control command.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units (collectively "components" in this paragraph) represented by a block in the drawings such as the processor 112 and the surrounding environment information detector 111 of the unmanned device 110, the device included in the control center 130, and the device included in the moving object 120 in FIG. 1 may be embodied as various numbers of hardware, software and/or firmware structures that execute respective functions described above, according to an example embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above example embodiments may be implemented in algorithms that execute on one or more processors. Furthermore, the components represented by a block or processing steps may employ any number of related art techniques for electronics configuration, signal processing and/or control, data processing and the like.

The communication interface 113 of the unmanned device 110 shown in FIG. 1 may include any one or any combination of a digital modem, a radio frequency (RF) modem, a WiFi chip, and related software and/or firmware. The control center 130 and the moving object 120 may also include a communication interface 113 of the unmanned device 110 for wireless communication therebetween.

Many modifications and other embodiments of the inventive concept will come to the mind of one skilled in the art having the benefit of the teachings presented in the foregoing descriptions and the associated drawings. Therefore, it is understood that the inventive concept is not to be limited to the specific embodiments disclosed, and that modifications and embodiments are intended to be included within the scope of the appended claims.

What is claimed is:

1. An unmanned device located at a predetermined height and comprising:
 a surrounding environment information detector, the surrounding environment information detector of the unmanned device configured to acquire information on a surrounding environment of a moving object;
 a processor, the processor of the unmanned device configured to generate a control command for the moving object based on the information on the surrounding environment; and
 a communication interface, the communication interface of the unmanned device configured to transmit the control command generated by the processor to the moving object,
 wherein the processor is configured to:
  compare the information on the surrounding environment with previously stored data;
  determine that the information on the surrounding environment has a predetermined degree of similarity to the previously stored data and generate a previously stored movement path as a movement path for the moving object based on the information on the surrounding environment having the predetermined degree of similarity to the previously stored data; and
  determine that the information on the surrounding environment does not have the predetermined degree of similarity to any of the previously stored data and generate, based on determining that the information on the surrounding environment of the moving object does not have the predetermined degree of similarity to any of the previously stored data, the movement path based on the information on the surrounding environment and not based on any of the previously stored data, and
 wherein the previously stored data comprises information on a surrounding environment of the previously stored movement path.

2. The unmanned device of claim 1, wherein the surrounding environment information detector comprises at least one of a camera configured to photograph the surrounding environment of the moving object and a light detection and ranging (LIDAR) sensor configured to detect the surrounding environment of the moving object.

3. The unmanned device of claim 1, wherein the communication interface transmits data received from the moving object to a control center and/or transmits data received from the control center to the moving object.

4. The unmanned device of claim 3, wherein the communication interface relays communication between the control center and the moving object based on determining that there is a hindrance to direct communication between the control center and the moving object.

5. The unmanned device of claim 1, wherein the control command generated by the processor comprises at least one of a movement path, movement speed, a movement distance, and a movement target point of the moving object.

6. The unmanned device of claim 1, wherein the processor derives a candidate movement path to a target point based on the information on the surrounding environment, and derives an optimal movement path by determining whether an obstacle or an enemy exists on the candidate movement path.

7. The unmanned device of claim 1, wherein the communication interface receives the information on the surrounding environment of the moving object from the moving object, and the processor generates the control command for the moving object based on the information on the surrounding environment and other information received from the moving object.

8. The unmanned device of claim 1, wherein the surrounding environment information detector acquires information on an area other than the surrounding environment of the moving object, from which information has already been acquired, based on a command execution time of the moving object according to a previously generated control command.

9. A wireless communication relay system comprising:
 a moving object which moves to a destination or performs a task while moving within a working range;
 a control center which performs wireless communication with the moving object; and
 an unmanned device which controls the moving object and/or the control center by generating a control command for the moving object and/or the control center based on information on a surrounding environment of the moving object and/or the control center, and relays communication between the control center and the moving object,
 wherein the unmanned device comprises:
  a surrounding environment information detector that is configured to acquire the information on the surrounding environment of the moving object and/or the control center;
  a processor that is configured to generate the control command for the moving object and/or the control center based on the information on the surrounding environment; and
 wherein the processor is configured to:
  compare the information on the surrounding environment with previously stored data;
  determine that the information on the surrounding environment has a predetermined degree of similarity to the previously stored data and generate a previously stored movement path as a movement path for the moving object based on the information on the surrounding environment having the predetermined degree of similarity to the previously stored data; and determine that the information on the surrounding environment does not have the predetermined degree of similarity to any of the previously stored data and generate, based on determining that the information on the surrounding environment of the moving object does not have the predetermined degree of similarity to any of the previously stored data, the movement path based on the information on the surrounding environment and not based on any of the previously stored data, and wherein the previously stored data comprises information on a surrounding environment of the previously stored movement path.

10. The wireless communication relay system of claim 9, wherein the unmanned device is located at a predetermined height, and further comprises:

a communication interface that is configured to transmit the control command generated by the processor to the moving object and/or the control center.

11. The wireless communication relay system of claim 9, wherein the control command generated by the unmanned device comprises at least one of a movement path, movement speed, a movement distance, a distance between the moving object and the control center, and a movement target point.

12. The wireless communication relay system of claim 9, wherein the moving object, the control center, and the unmanned device transmit and receive, and thus, share at least one of a current position of at least one of the moving object, the control center, and the unmanned device, movement speed of at least one of the moving object, the control center, and the unmanned device, and data stored in at least one of the moving object, the control center, and the unmanned device, on a real time basis.

13. The wireless communication relay system of claim 9, wherein when a situation where the moving object cannot move occurs, the moving object, the control center and the unmanned device stop moving, and the unmanned device searches again for a movement path along which the moving object can move.

14. The wireless communication relay system of claim 9, wherein based on reception strength of communication between the moving object, the control center and the unmanned device being less than a threshold level, the movement of the moving object is stopped, and the control center and/or the unmanned device moves so that the reception strength of the communication between the moving object, the control center and the unmanned device becomes equal to or greater than the threshold level.

15. A wireless communication relay method comprising:

acquiring, by an unmanned device, information on a surrounding environment of a moving object and/or a control center;

generating, by the unmanned device, a control command for the moving object and/or the control center using the information on the surrounding environment; and transmitting, by the unmanned device, the control command to the moving object and/or the control center, wherein the unmanned device is located at a predetermined height to relay communication between the moving object and the control center, wherein the generating the control command comprises:
  comparing, by the unmanned device, the information on the surrounding environment with previously stored data;
  determining, by the unmanned device, that the information on the surrounding environment does not have a predetermined degree of similarity to any of the previously stored data; and
  generating, by the unmanned device and based on determining that the information on the surrounding environment of the moving object does not have the predetermined degree of similarity to any of the previously stored data, the control command based on the information on the surrounding environment and not based on any of the previously stored data, and wherein the previously stored data comprises information on a surrounding environment of a previously stored movement path.

16. The method of claim 15, further comprising:

storing, by the unmanned device, the control command and the information on the surrounding environment of the moving object together based on determining that the information on the surrounding environment of the moving object does not have the predetermined degree of similarity to any of the previously stored data.

17. The method of claim 16, wherein the generating the control command comprises:

deriving, by the unmanned device, a candidate movement path to a target point by using the information on the surrounding environment; and deriving, by the unmanned device, an optimal movement path by determining whether an obstacle or an enemy exists on the candidate movement path.

18. The method of claim 15, wherein the control command comprises at least one of a movement path, a movement speed, a movement distance, and a movement target point of the moving object.

* * * * *